3,293,338
METHOD OF MAKING FOAM ARTICLES
Walter D. Voelker, Philadelphia, Pa., assignor, by mesne assignments, to Allied Chemical Corporation, New York, N.Y., a corporation of New York
Filed Nov. 23, 1962, Ser. No. 239,620
2 Claims. (Cl. 264—54)

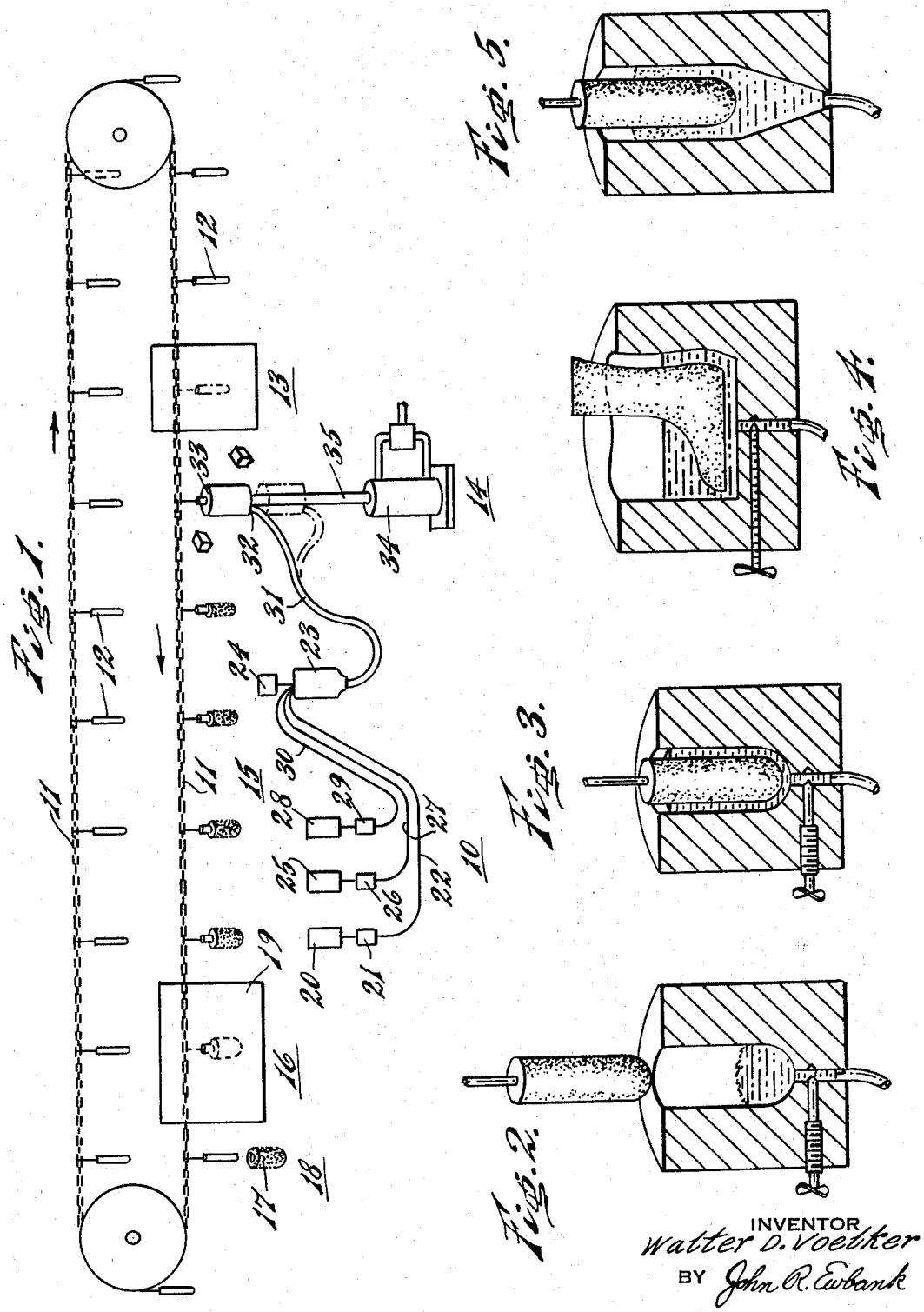

This invention relates to the manufacture of polyurethane foam articles and particularly to the production of relatively small simple shaped devices having a reasonably uniform thickness of polyurethane foam such as from about 1/8" to about 1".

Heretofore a variety of polyurethane articles have been made by casting a foam forming mixture in a mold, and this technique has proven to be advantageous for making large bulky articles. However, disadvantages arise in attempting to produce small uniformly thick articles by such standard procedures.

In accordance with the present invention, a polyurethane foam article is prepared by dipping a member in a polyurethane foam forming composition and thereafter advancing the dipped and coated form through a plurality of zones including a final curing zone whereby the foam forming composition is transformed into a uniformly thick polyurethane foam article. The thus manufactured article is removed from the form which is then reused in the dipping procedure.

The nature of the invention is further clarified by reference to the accompanying drawings.

FIG. 1 is a schematic view of a production line utilizing the dipping technique of the present invention.

FIG. 2 is a schematic showing, partly sectional, of a form just prior to dipping. FIG. 3 is a schematic showing of the dipping of the form of FIG. 2. FIG. 4 is a schematic showing of the dipping of an unsymmetrical form. FIG. 5 is a schematic showing of the dipping of a form in a pot containing a larger volume of coating composition.

Referring now in detail to the drawing, there is shown a production line 10 suitable for the manufacture of thin polyurethane foam particles such as protective pads to be employed as insulating and shock absorbing devices on the bottom of table legs. The production line 10 includes a conveyor belt 11 from which are suspended a plurality of forms 12 having the shape to be imparted to the article. The forms 12 advance through a pre-conditioning zone 13 and toward a dipping zone 14 in which each form is successively dipped into a polyurethane foam forming composition. The coated form advances from the dipping zone 14 through an expansion zone 15 and thence into a curing zone 16. The forms leaving the curing zone 16 carry an article 17 which has developed from the precursor, which term designates the coating on one of the forms 12 from the time of dipping through the various stages of rising and curing until the product is sufficiently cured to be suitable for removal from the form in a product withdrawal zone 18. It may be noted that the pre-conditioning zone 13 may serve to heat each of the forms to a temperature such that the quantity of polyurethane foam forming composition deposited thereon by the dipping is more uniform than would be possible without the heating step. The curing zone 16 may include an oven 19 in which heat is applied to the precursor by the reaction of isocyanato groups and hydroxyl groups, or the oven 19 may serve merely to insulate the precursor while it is cured autogenically.

It should be especially noted that the method is adapted to minimize the likelihood of the development of stale polyurethane foam forming composition in stagnant zones, and that the dipping operation is conducted in such a way as to maintain a forward flow of the polyurethane foam forming composition.

The system for supplying polyurethane foam forming composition to the dipping zone 14 is adapted to operate continuously notwithstanding the intermittent nature of the dipping operation. A source of supply 20 for the polyol is connected with a metering pump 21 which directs the polyol through a conduit 22 to a mixer 23 powered by a motor 24. Similarly a polyisocyanate supply source 25 is connected through metering pump 26 and conduit 27 to the mixer 23. There are modifiers including catalyst, surfactant, dyes, and other components utilized in formulations for polyurethane article manufacture which modifiers may be maintained in one or more supply systems patterned after those employed for the polyol and polyisocyanate. Such modifiers are conveniently and schematically designated as being sent from a supply source 28 through a metering pump 29 and conduit 30 to the mixer 23.

The foam forming composition prepared by the mixer is directed through conduit 31 to an inlet 32 at the bottom of a dip tank 33, and this continuous supply of polyurethane foam forming composition is withdrawn as a coating of polyurethane foam forming composition applied onto the form 12 in the dip tank 33 of the dipping zone 14.

It should be noted that the drawings schematically indicate that the dipping operation involves relative vertical movement between the form 12 and the dip tank with substantially no relative horizontal movement of the form 12 through the polyurethane foam forming composition. In this manner, the quantity of polyurethane foam forming composition maintained in the dip tank is only a small fraction of the quantity required in a conventional dip coating process. Because the quantity in the pool is always a few times greater than the quantity withdrawn per form, and because the supply is constantly replenished through conduit 31 at the same rate at which it is withdrawn, there is always sufficient polyurethane forming composition to achieve the desired coating of the form by the dipping operation. As shown in FIG. 1, the dip tank 33 may be intermittently raised and lowered to accomplish this dipping of the form 12 into the coating, and the conveyor belt 11 can be operated intermittently instead of advancing continuously. An air cylinder 34 can actuate a piston 35 to maintain the vertical reciprocation of the dipping tank on the design schedule. The conventional system of using a light beam and photo cell to detect the arrival of a form at the dipping zone may be employed if desired.

Alternatively, the form can be dipped into the stationary tank. It is the absence of relative horizontal movement between the form and the liquid which is important, and the small tank can be made to reciprocate on a cycle achieving this result during the continuous advancement of the conveyor belt. The vat portion of the dip tank 33 has a shape closely corresponding to that of the form 12, so that the small pool coats the form dipped into the tank notwithstanding the small quantity in the pool.

Particular attention is directed to the progressive forward flow of the foam-forming mixture from the mixer 23, through conduit 31, into the bottom of the dipping tank 33 and onto the forms 12. By thus preventing the accumulation of stale material and keeping the pool small, polyurethane foam articles are manufactured while achieving all the advantages of dip coating.

As shown in FIG. 2, the level of the liquid in the dipping pot may be relatively low prior to the dipping of the form. As shown in FIG. 3, the liquid polyurethane foam forming mixture rises to coat the form to the predetermined level as the immersed form displaces the small volume of liquid in the dipping tank. As shown in FIG.

4, irregularly shaped forms, such as a form for a shoe, may be dipped in a tank having a sufficiently small volume of foam forming mixture to be able to maintain the forward flow of the mixture without the accumulation of stale mixture in the dipping tank. It is not necessary to closely match the shapes of the bottoms of the form and dipping tank, inasmuch as the forward flow of the mixture can be maintained even with the relationship shown schematically in FIG. 5.

Various modifications of the invention are possible without departing from the scope of the appended claims.

The invention claimed is:

1. A method of producing shaped articles of polyurethane foam on a continual basis which comprises continuously preparing a liquid polyurethane-foam-forming-composition, continuously directing the liquid composition to a dipping vat so as to maintain a pool thereof within the vat, successively immersing each of a plurality of advancing forms which are positioned above the dipping vat and have the shape of the desired polyurethane foam article in the pool, withdrawing the form from the vat with a coating of the polyurethane-foam-forming-composition adhering thereto, heating the coated form to cure the coating to a polyurethane foam article of the desired shape, and removing the polyurethane foam article from the form; said dipping vat having a shape like that of said form and a volume of such magnitude that the immersed form displaces a substantial proportion of the polyurethane-foam-forming-composition contained therein, said polyurethane-foam-forming-composition being continuously supplied to said vat at a rate equal to the rate of its removal therefrom through adhering to said form, and the relative movement of said form and said vat being controlled to effect immersion and withdrawal of said form in said vat along substantially the same vertical path.

2. The method of claim 1 wherein the form is heated just prior to immersion in the dipping vat.

References Cited by the Examiner
UNITED STATES PATENTS 2,169,847    8/1939    Murphy et al. _____ 264—303
2,254,262    9/1941    Bratring _____ 264—303

ROBERT F. WHITE, *Primary Examiner.*

ALEXANDER H. BRODMERKEL, *Examiner.*

M. H. ROSEN, M. R. DOWLING, *Assistant Examiners.*